United States Patent [19]

Nalesnik et al.

[11] Patent Number: 5,169,546

[45] Date of Patent: Dec. 8, 1992

[54] MULTIFUNCTIONAL VISCOSITY INDEX IMPROVERS HAVING DISPERSANT AND ANTIOXIDANT PROPERTIES AND LUBRICATING OIL COMPOSITION CONTAINING SAME

[75] Inventors: Theodore E. Nalesnik, Wappingers Falls; Sheldon Herbstman, New City, both of N.Y.

[73] Assignee: Texaco Inc., White Plains, N.Y.

[21] Appl. No.: 546,998

[22] Filed: Jul. 2, 1990

[51] Int. Cl.$^5$ ............... C10M 133/44; C10M 147/02
[52] U.S. Cl. .................... 252/47; 252/47.5; 252/50; 252/51; 252/51.5 R; 252/58
[58] Field of Search ............ 252/51, 47.5, 47

[56] References Cited

U.S. PATENT DOCUMENTS

| | | | |
|---|---|---|---|
| 3,953,348 | 4/1976 | Lee | 252/51 |
| 4,863,623 | 9/1989 | Nalesnik | 252/50 |
| 5,013,469 | 5/1991 | DeRosa et al. | 252/51.5 A |
| 5,075,383 | 12/1991 | Migdal et al. | 252/51 |

Primary Examiner—Ellen McAvoy

Attorney, Agent, or Firm—Robert A. Kulason; James J. O'Loughlin; Dominick G. Vicari

[57] ABSTRACT

An additive, a lubricating oil composition which incorporates the additive, and a concentrate for a lubricating oil are disclosed. The additive includes (a) a halogenated copolymer prepared from ethylene, a $C_3$ to $C_{18}$ alpha-olefin, preferably a $C_3$ to $C_8$, or mixtures thereof, and at least one halogen, and (b) an amino-aromatic polyamine compound. Most preferably, the copolymer is prepared from ethylene, propylene and at least one polyene.

The lubricating oil composition comprises a major amount of an oil of lubricating viscosity and a minor amount, effective to impart viscosity index improvement, dispersancy and antioxidant properties to the oil, of the prescribed additive.

The concentrate comprises a diluent oil of lubricating oil viscosity and from about 1 to about 50 weight percent of the prescribed additive based on the total weight of the concentrate.

28 Claims, No Drawings 5,169,546

MULTIFUNCTIONAL VISCOSITY INDEX IMPROVERS HAVING DISPERSANT AND ANTIOXIDANT PROPERTIES AND LUBRICATING OIL COMPOSITION CONTAINING SAME

BACKGROUND OF THE INVENTION

1. Field of the Invention

This invention relates generally to viscosity index (VI) improvers and, more particularly, to VI improvers which also exhibit favorable dispersant and antioxidant properties.

2. Description of the Background Art

The art contains many disclosures on the use of polymer additives in lubricating oil compositions. Ethylene-propylene copolymers and ethylene alpha-olefin non-conjugated diene terpolymers which have been further derivatized to provide bifunctional properties in lubricating oil compositions illustrate this type of oil additive.

U.S. Pat. No. 3,522,180 describes a method for the preparation of an ethylene-propylene copolymer substrate effective as a viscosity index improver for lubricating oils.

U.S. Pat. No. 4,026,809 describes grafted copolymers of a methacrylate ester and an ethylene-propylene-alkylidene norbornene terpolymer as a viscosity index improver for lubricating oils.

U.S. Pat. No. 4,032,700 describes a process for preparing aminated polymers which includes halogenating a copolymer of ethylene, a $C_3$ to $C_{18}$ a straight or branched chain alpha-chain olefin and a $C_5$ to $C_{14}$ acyclic or alicyclic non-conjugated diolefin and thereafter reacting said copolymer with a simple amine. The additives so produced are described as dispersants for hydrocarbon fuels or lubricants and as multifunctional dispersant-viscosity index improvers for lubricants. There is neither any express or implied recognition of using the particular amines described below to prepare the multifunctional VI improvers of this invention, nor is there any recognition of the antioxidant properties exhibited by the VI improvers of this invention.

U.S. Pat. No. 4,089,794 describes substantially saturated polymers comprising ethylene and one or more $C_3$ to $C_{28}$ alpha-olefins which have been solution-grafted in the presence of a free-radical initiator with an ethylenically-unsaturated carboxylic acid material at an elevated temperature, preferably in an inert atmosphere, and thereafter reacted with a polyfunctional material reactive with carboxy groups, such as (a) a polyamine, (b) a polyol, or (c) a hydroxyamine or mixtures thereof, to form polymeric reaction products. The reaction products are described as sludge-dispersing additives for hydrocarbon fuels and lubricating oils.

U.S. Pat. No. 4,137,185 describes a stabilized imide graft of an ethylene copolymer additive for lubricants.

U.S. Pat. No. 4,144,181 describes polymer additives for fuels and lubricants comprising a grafted ethylene copolymer reacted with a polyamine, polyol or hydroxyamine and finally reacted with a alkaryl sulfonic acid.

U.S. Pat. No. 4,146,489 describes a grafted copolymer where the backbone polymer is an oil-soluble ethylene-propylene copolymer or an ethylene-propylene-diene modified terpolymer with a graft monomer of C-vinylpyridine or N-vinylpyrrolidone to provide a dispersantVI improver for lubricating oils.

U.S. Pat. No. 4,320,019 describes a multipurpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 describes a process for grafting a functional organic group onto an ethylene copolymer of an ethylene-propylene-diene terpolymer.

U.S. Pat. No. 4,357,250 describes a reaction product of a copolymer and an olefin carboxylic acid via the "ene" reaction followed by a reaction with a monoamine-polyamine mixture.

U.S. Pat. No.4,382,007 describes a dispersant - VI improver prepared by reacting a polyamine-derived dispersant with an oxidized ethylene-propylene polymer or an ethylene-propylene diene-terpolymer.

U.S. Pat. No. 4,698,169 describes a product made by reacting an alkenylsuccinic compound with an arylamine and an alkanolamine, an aminomethane or a hindered alcohol. The product is reported as providing dispersant and antioxidant activity to lubricant compositions when incorporated therein.

Commonly owned U.S. Pat. No. 4,863,623 describes an additive comprising an ethylene copolymer or terpolymer of a $C_3$ to $C_{10}$ alpha-monoolefin and optionally a non-conjugated diene or triene on which has been grafted an ethylenically unsaturated carboxylic function which is then further derivatized with certain amino-aromatic polyamine compounds.

It is, therefore, our understanding that the multifunctional viscosity index improver of this invention, which also exhibits favorable antioxidant properties because it includes the particular amines described below, has heretofore been unavailable.

SUMMARY OF THE INVENTION

Accordingly, the present invention relates to an additive comprising (a) a halogenated copolymer prepared from ethylene, a $C_3$ to $C_{18}$ a alpha olefin or mixtures thereof, and at least one halogen, and (b) an amino-aromatic polyamine compound. The prescribed additive is preferably employed as a multifunctional VI improver, which also exhibits favorable dispersant and antioxidant properties.

The present invention also relates to a lubricating oil composition comprising a major amount of an oil of lubricating viscosity and a minor amount, effective to impart viscosity index improvement, dispersancy and antioxidant properties to the oil, of the prescribed additive.

The present invention further relates to a concentrate for a lubricating oil comprising a diluent oil of lubricating oil viscosity and from about 1 to about 50 weight percent of the prescribed additive, based on the total weight of the concentrate.

DESCRIPTION OF THE PREFERRED EMBODIMENTS

The basic copolymers used to prepare the additives of this invention are prepared from ethylene, $C_3$ to $C_{18}$ a alpha-olefins or mixtures thereof. It is to be understood that the term "alpha-olefin", as used herein, also encompasses substituted olefin derivatives. By way of illustration, the $C_3$ to $C_{18}$ alpha-olefins can be selected from propylene, 1-butene, 1-pentene, 1-hexene, 1-heptene, 1-styrene, 1-decene, 1-dodecene, etc. Preferably, the copolymers are prepared from ethylene and a $C_3$ to $C_8$ alpha-olefin or a mixture thereof and, most preferably, the $C_3$ to $C_8$ olefin is propylene.

Optionally, the basic copolymer structure can be prepared by employing, in addition to those monomers identified above, a polyene, such as a diene or triene, as a third component. Accordingly, in those instances where the polyene is optionally employed, the term "copolymer" is intended to include the polyene-containing copolymers. The diene can be selected from (a) straight chain acyclic dienes, such as 1,4-hexadiene, 1,5-heptadiene and 1,6-octadiene; (b) branched chain acyclic dienes, such as 5-methyl-1, 4-hexadiene, 3,7-dimethyl 1,6-octadiene, 3,7-methyl 1,7-octadiene, and the mixed isomers of dihydromyrcene and dihydroocimene; (c) single ring alicyclic dienes, such as 1,4-cyclohexadiene, 1,5-cyclo-octadiene, 1,5-cyclododecadiene, 4-vinylcyclohexene, 1-allyl 4-isopropylidene cyclohexane, 3-allyl-cyclopentene, 4-allyl-cyclohexene and 1-isopropenyl 4(4-butenyl)cyclohexane; (d) multi-single ring alicyclic dienes, such as 4,4'-dicyclopentenyl and 4,4'-dicyclohexenyl dienes; and (e) multi-ring alicyclic fused and bridged ring dienes, such as tetrahydroindene, methyl tetrahydroindene dicyclopentadiene, bicyclo(2,2,1) hepta-2,5-diene, alkenyl, alkylidene, cycloalkenyl and cycloalkylidene norbornenes, such as 5-methylene-2-norbornene, 5-ethylidene-2- norbornene, 5-methylene-6-methyl-2-norbornene, 5-methylene-6,6-dimethyl-2-norbornene, 5-propenyl-2-norbornene, 5-(3-cyclopentenyl)-2-norbornene and 5-cyclohexylidene-2-norbornene. Mixtures of the aforesaid dienes may also be used.

The triene can be selected from trienes having a least two non-conjugated double bonds, and up to about 30 carbon atoms in the chain. Typical trienes useful in preparing the basic copolymer of the additives of this invention are 1-isopropylidene-3$a$,4,7,7$a$-tetrahydroindene, 1-isopropylidene-dicyclopentadiene, dehydro-isodicyclopentadiene, and 2-(2-methylene-4-methyl-3-pentenyl) [2.2.1]bicyclo-5-heptene. Mixtures of the aforesaid trienes may also be used. Also, it is within the scope of this invention to use mixtures of dienes and trienes.

The polymerization reaction used to form the basic copolymer structure can be carried out in batch, staged or continuous reactors and is conducted in the presence of a Ziegler-Natta catalyst. In general, the catalyst compositions used to prepare these copolymers comprise a principal catalyst consisting of a transition metal compound from Groups IV(b), V(b) and VI(b) of the Periodic Table of Elements, particularly compounds of titanium and vanadium, and organometallic reducing compounds from Groups II(a), II(b) and III(a), particularly organoaluminum compounds which are designated as cocatalysts. Preferred principal catalysts of vanadium have the general formula $VO_zX_t$ wherein z has a value of 0 or 1 and t has a value of 2 to 4. X is independently selected from halogens having an atomic number equal to or greater than 17, acetylacetonates, haloacetylacetonates, alkoxides and haloalkoxides. Non-limiting examples are: $VOCl_3$; $VO(AcAc)_2$; $VOCl(OBu)$; $V(AcAc)_3$; and $VOCl_2(AcAc)$ where Bu is n-butyl or isobutyl, and (AcAc) is an acetylacetonate.

Preferred cocatalysts have the general formula $ALR'_mX'_n$, where R' is a monovalent hydrocarbon radical selected from the group consisting of $C_1$ to $C_{12}$ alkyl, alkylaryl, arylalkyl and cycloalkyl radicals, X' is a halogen having an atomic number equal to or greater than 17, m is a number from 1 to 3, and the sum of m and n is equal to 3. Non-limiting examples of useful cocatalysts are: $Al(Et)_3$; $EtAlCl$; $EtAlCl_2$ and $Et_2Al_2Cl_3$.

Also, in a preferred embodiment, the polymerization reaction is conducted in a solvent medium. The polymerization solvent may be any suitable inert organic solvent that is liquid under reaction conditions for solution polymerization of the aforementioned monomers. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus, such as benzene, toluene and the like; and saturated cyclic hydrocarbons having boiling point ranges approximating those of the straight chain paraffinic hydrocarbons and aromatic hydrocarbons described above are particularly suitable. The solvent selected may be a mixture of one or more of the foregoing hydrocarbons. It is desirable that the solvent be free of substances that will interfere with Ziegler-Natta polymerization reactions.

Suitable times of reaction will generally be in the range from 1 to 300 minutes, temperatures will usually be in the range of 0° C. to 100° C., and pressures from atmospheric to 160 psig are generally used. Monomer feed to the reactor per 100 parts by weight of solvent may be in the range of 2 to 20 parts by weight of ethylene, 4 to 20 parts by weight of the $C_3$ to $C_{18}$ alpha-olefin and 0.1 to 10 parts by weight of the polyene.

Principal catalyst, $VOCl_3$ for example, prediluted with solvents is fed to the reactor so as to provide a concentration in the range of 0.1 to 5.0 millimoles per liter. Cocatalyst, for example, $Et_2Al_2Cl_3$, is at the same time fed to the reactor in an amount equal to from 2.0 to 20.0 moles of cocatalyst per mole of principal catalyst.

The basic copolymers generally include from about 15 to about 80 mole percent ethylene and from about 20 to about 85 mole percent propylene or higher alpha-olefins, with the preferred mole ratios being from about 25 to about 75 mole percent ethylene and from about 25 to about 75 mole percent of a $C_3$ to $C_8$ alpha-olefin, with the most preferred proportions being from about 25 to about 55 mole percent ethylene and about 45 to about 75 mole percent propylene.

Where the polyene is optionally employed, the copolymer can include from about 0.1 to about 10 mole percent of the polyene component.

The basic copolymers used in accordance with the present invention can be selected from commercially available products, such as VISTALON, an elastomeric copolymer of ethylene, propylene and 5-ethylidene, 2-norbornene, marketed by Exxon Chemical Co. and Nordel, a copolymer of ethylene, propylene and 1,4-hexadiene, marketed by E. I. duPont de Nemours & Co., Wilmington, Del.

In a most preferred embodiment, the basic copolymer employed is Ortholeum 2052, an ethylene-propylene-hexadiene copolymer with about 5 weight percent unsaturation, which is also marketed by E. I. duPont de Nemours & Co.

The next step in preparing the additives of this invention involves halogenating the basic copolymer. The halogenation of the copolymer which, again, can include the polyene-containing copolymer, can be carried out by simply dissolving the copolymer in a solvent, preferably a solvent which is substantially inert to the halogen material, and adding halogen, e.g., gaseous chlorine, liquid bromine, into the solution, preferably at rather low temperatures, e.g., from about 0° C. to about 100° C. Primarily depending on the amount of halogen added and the number of double bonds available, 0.1 to 10.0, e.g., 0.2 to 8.0 weight percent halogen, e.g., Cl or Br, based on the weight of halogen containing copolymer, can be added to the copolymer. If the reaction is carried out in an inert volatile solvent, then a nonvolatile oil can be later added to the reaction product solution and the volatile solvent evaporated to thereby form an oil concentrate of the halogen containing diolefin copolymer for further handling. Alternatively, isolation of the halogenated polymer may be readily carried out, e.g., by precipitation, in media such as acetone or isopropanol or by stripping with steam, etc.

In general, these techniques are known in the art; for example, bromination of copolymers of ethylene, a $C_3$ to $C_8$ alpha-olefin and a $C_3$ to $C_{14}$ non-conjugated diolefin is illustrated in U.S. Pat. No. 3,524,826.

The halogenated copolymers or diolefin copolymers are next aminated to produce the additives of this invention. Because of the favorable antioxidation properties exhibited by the additives of this invention, which properties are ascribed to the particular amines employed, the amines may be referred to as antioxidant amines. Generally, the amines are amino-aromatic polyamine compounds. By way of illustration, the aforesaid compounds can include:

(a) N-aminopropyl-N'-phenylphenylenediamine (NAPNPPDA);

(b) an N-arylphenylenediamine represented by the formula:

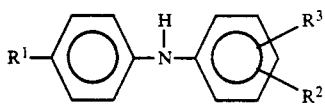

in which $R^1$ is hydrogen, —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, $CH_2$—$(CH_2)_n$—$NH_2$, $CH_2$—aryl—$NH_2$, in which n has a value from 1 to 10, and $R^3$ is H, alkyl, alkenyl, alkoxyl, aralkyl, alkaryl having from 4 to 24 carbon atoms;

(c) an aminocarbazole represented by the formula:

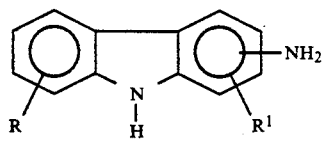

in which R and R' represent hydrogen or an alkyl, alkenyl, or alkoxyl radical having from 1 to 14 carbon atoms;

(d) an amino-indazolinone represented by the formula:

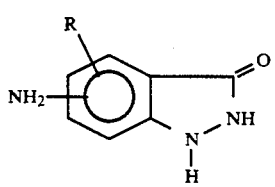

in which R is hydrogen or an alkyl radical having from 1 to 14 carbon atoms;

(e) an aminomercaptotriazole represented by the formula:

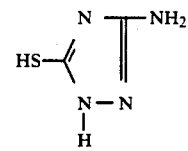

(f) an aminoperimidine represented by the formula:

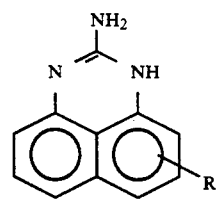

in which R represents hydrogen or an alkyl or alkoxyl radical having from 1 to 14 carbon atoms.

Particularly preferred N-arylphenylenediamines are the N-phenylphenylenediamines, for example, N-phenyl-1,4-phenylene-diamine, N-phenyl-1,3-phenylenediamine, N-phenyl-1,2-phenylene-diamine, N-naphthyl-1,4-phenylenediamine and N-aminopropyl-N'-phenylphenylenediamine.

Reaction of the halo-copolymer, usually dissolved in a solvent or diluent oil, with the amino-aromatic polyamine compound will typically be carried out at a temperature in the range of about 20° C. to about 200° C. for about 0.1 to about 100 hours, and at atmospheric pressure. It is desirable to maintain an inert atmosphere, such as a nitrogen atmosphere, in the reaction mixture. The reaction can be carried out in the presence of a base, such as a metal oxide, hydroxide, etc., preferably an alkaline earth metal oxide, e.g., CaO or BaO to absorb any hydrochloric acid that may evolve. With use of a metal base, it can be later removed by centrifuging or filtration at the end of the reaction.

The aminated halo-copolymers of the invention are useful as additives for lubricating oils. They are multifunctional additives for lubricants being effective to provide dispersancy, viscosity index improvement and antioxidant properties to lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metalworking lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 1 to about 30 weight percent. A preferred concentration range for the additive is from about 8 to about 15 weight percent based on the total weight of the oil composition.

Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, anti-wear agents and the like.

The following Examples I-V are provided to further illustrate preferred embodiments of preparing the additives used in the method of this invention and should not be construed as limiting the present invention in any way.

EXAMPLE I

In this example, a sample of chlorinated Ortholeum 2052 was prepared. Specifically, 2250 ml of hexane and 350 grams of ⅛-inch cubes of Ortholeum 2052 were added to a 5 liter reaction flask which was equipped with a mechanical stirrer, thermometer, a gas inlet bubbler and a gas outlet to a chlorine trap. The contents of the flask were stirred at room temperature until the Ortholeum 2052 dissolved. A 2:3 volumetric mixture of nitrogen:chlorine gas was bubbled through the solution at room temperature for one hour and at a flow rate of 250 ml/min while the solution was rapidly stirred. A rise in temperature from room temperature to 35° C. was observed. After the introduction of the nitrogen:-chlorine gas mixture was terminated, the solution was flushed with nitrogen for one hour with stirring. To this solution was added 2250 ml of SNO-100 base oil followed by removal of hexane under vacuum. The base oil was added in an amount such that the final copolymer content in the oil was 13.5 weight percent.

EXAMPLE II

In this example, a sample of an aminopropylmorpholine Ortholeum (APMO) VI improver was prepared. A 250 gram portion of the chlorided Ortholeum 2052 (2.3 weight percent chlorine) prepared in Example I was added to a 500 ml flask equipped with a mechanical stirrer, thermometer, and a nitrogen inlet and outlet for a nitrogen blanket. The temperature of the solution was raised to 160° C. and, while the solution was being stirred, 1.6 grams of aminopropylmorpholine and 6.0 grams of calcium oxide were added to the solution. The reagents were permitted to react for 72 hours at 160° C. under nitrogen. The solution was thereafter cooled to room temperature and reaction product dissolved in 500 ml of hexane and then centrifuged (2000 rpm) to remove any unreacted calcium oxide. Finally, the hexane was removed from the aminopropylmorpholine Ortholeum oil soltuion under vacuum at 150° C.

EXAMPLE III

In this example, a sample of a dimethylaminopropylamine Ortholeum VI improver was prepared in substantially the same manner as the APMO VI improver was prepared in Example II. In this example, however, a 230 gram portion of the chlorinated rubber oil solution was employed. Also, 5.6 grams of the calcium oxide were employed and 1.5 grams of dimethylaminopropylamine (as opposed to 1.6 grams of aminopropylmorpholine) were employed.

EXAMPLE IV

In this example, a sample of an N-phenyl-phenylenediamine Ortholeum VI improver was prepared in substantially the same manner as the APMO VI improver was prepared in Example II. In this example, however, a 500 gram portion of the chlorinated rubber oil solution was added to a 1 liter reaction flask. Also, 12.0 grams of the calcium oxide were employed and 4.0 grams of N-phenylphenylenediamine (as opposed to 1.6 grams of aminopropylmorpholine) were employed. Finally, in this example, the reaction product was dissolved in 1000 ml of hexane and centrifuged.

EXAMPLE V

In this example, a sample of an N-aminopropyl-N'-phenylphenylenediamine Ortholeum VI improver was prepared in substantially the same manner as the APMO VI improver was prepared in Example II. In this example, however, 1.8 grams of N-aminopropyl-N'-phenyl-phenylenediamine (as opposed to 1.6 grams of aminopropylmorpholine) were employed. Also, in this example, as in Example IV, a 1 liter reaction flask and 1000 ml of hexane were employed.

The reaction products produced in Examples I-V were incorporated into a lube oil formulation which was tested for oxidation using the Bench Oxidation Test (BOT) and for dispersancy using the Bench Sludge Test (BST); the results are reported in Table 1.

The BOT measures the relative increase of the carbonyl absorption band of 1710 cm$^{-1}$ of an oxidized oil, over that of the starting material. The test was conducted in a 2 liter, 4-neck resin kettle equipped with a thermometer, condenser, gas bubbling tube and a mechanical stirrer. 135 grams of the test VI improver was added along with SNO-7 oil totalling 1160 grams. The reaction mixture was stirred and purged with nitrogen for 30 min. The solution was then heated to 150° C. and initial samples were taken (0 hr. samples). The oxidation was started by switching from a nitrogen purge to one of air at a rate of 500 ml/min. The stirring rate was kept between 675 and 700 rpms. Samples were taken periodically using a syringe and evacuated test tubes. They were then quickly stored in a refrigerator to quench the oxidation. BOT DIR values were obtained by using a Differential Infrared technique (DIR) in which the carbonyl absorption band at 1710 cm$^{-1}$ of the zero hour sample, was subtracted from that of the final product (144 hrs.).

The dispersancy of the additives was evaluated in the Bench Sludge Test (BST) which measures the ability of a dispersant to solubilize particles in the oil. This test was conducted by heating the test oil mixed with a synthetic hydrocarbon blowby and a diluent oil at a fixed temperature for a fixed time period. After heating, the turbidity of the resulting mixture was measured. A low percentage turbidity (0-10) is indicative of good dispersancy while an intermediate value (20-40) indicates intermediate dispersancy and a high value (40-100) indicates an increasingly poor dispersancy. The additives were tested at a 10 weight percent treating dosage in an SAE 10W-30 formulation and compared to good, fair and poor references as provided below in Table 1.

TABLE 1

Dispersant-Antioxidation Performance of Pre-chlorinated VI Improver Amine Derivatives

| Example No. | BST Results | BOT Results |
| --- | --- | --- |
| I | 92 | 13.0 |
| II | 46 | 13.5 |
| III | 43 | 11.2 |
| IV | 56 | 0.73 |
| V | 27 | 0.76 |

In the tests conducted, the lower the numerical values for the data shown above, the better the antioxidant and dispersant properties. Accordingly, as these data demonstrate, while all of the additives prepared in Examples II–V exhibit effective dispersancy properties, the additives of the present invention (Examples IV and V) exhibit substantially superior antioxidant properties relative to those non-inventive additives of Examples II and III. The non-inventive additives were prepared from certain simple amines described in U.S. Pat. No. 4,032,700.

What is claimed is:

1. An additived comprising: (a) a halogenated copolymer prepared by reacting, at a temperature of 0° C. to 100° C. and a pressure of 1 atmosphere to 160 psig and in a solvent medium, 2 to 20 parts by weight of ethylene per 100 parts by weight of solvent and 4 to 20 parts by weight of a $C_3$ to $C_{18}$ alpha-olefin or mixtures thereof per 100 parts by weight of solvent to provide a copolymer, and reacting said copolymer with 0.1 to 10 weight percent of at least one halogen based on the weight of said halogenated copolymer; and (b) an aminoaromatic polyamine compound.

2. The additive of claim 1 wherein said halogenated copolymer is prepared from a $C_3$ to $C_8$ alpha-olefin.

3. The additive of claim 1 wherein said $C_3$ to $C_{18}$ alpha-olefin is propylene.

4. The additive of claim 1 wherein said $C_3$ to $C_{18}$ a alpha-olefin is styrene.

5. The additive of claim 1 wherein said copolymer further includes at least one polyene.

6. The additive of claim 5 wherein said polyene comprises straight chain acyclic dienes, branched chain acyclic dienes, single ring alicyclic dienes, multi-single ring alicyclic dienes, multi-ring alicyclic fused and bridged ring dienes, trienes having at least two non-conjugated double bonds and up to about 30 carbon atoms in the chain, and mixtures thereof.

7. The additive of claim 1 wherein said at least one halogen comprises chlorine or bromine.

8. The additive of claim 1 wherein said aminoaromatic polyamine compound comprises:

(a) N-aminopropyl-N'-phenylphenylenediamine;

(b) an N-arylphenylenediamine represented by the formula:

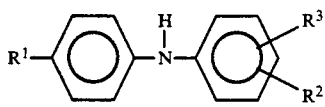

in which $R^1$ is hydrogen, —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, $CH_2$—$(CH_2)_n$—$NH_2$, $CH_2$—aryl—$NH_2$, in which n has a value from 1 to 10, and $R^3$ is H, alkyl, alkenyl, alkoxyl, aralkyl, alkaryl having from 4 to 24 carbon atoms;

(c) an aminocarbazole represented by the formula:

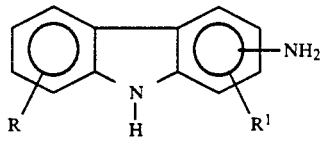

in which R and $R^1$ represent hydrogen or an alkyl, alkenyl, or alkoxyl radical having from 1 to 14 carbon atoms;

(d) an amino-indazolinone represented by the formula:

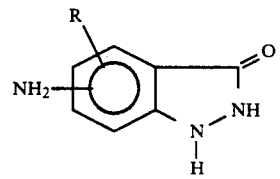

in which R is hydrogen or an alkyl radical having from 1 to 14 carbon atoms;

(e) an aminomercaptotriazole represented by the formula:

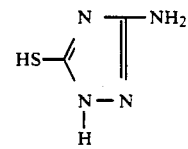

(f) an aminoperimidine represented by the formula:

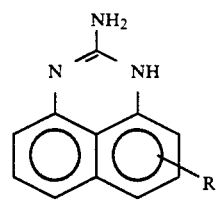

in which R represents hydrogen or an alkyl or alkoxyl radical having from 1 to 14 carbon atoms.

9. The additive of claim 8 wherein said N-arylphenylene-diamine is selected from the group consisting of N-phenyl-1,4-phenylenediamine, N-phenyl-1,3-phenylenediamine, N-phenyl-1,2-phenylenediamine, N-naphthyl-1,4-phenylenediamine and N-aminopropyl-N'-phenylphenylenediamine.

10. A multifunctional viscosity index improver, which exhibits antioxidant and dispersant properties, comprising: (a) a halogenated copolymer prepared by reacting, at a temperature of a 0° C. to 100° C. and a pressure of 1 atmosphere to 160 psig in a solvent medium, 2 to 20 parts by weight of ethylene per 100 parts by weight of solvent and 4 to 20 parts by weight of a $C_3$ to $C_8$ alpha-olefin or mixtures thereof per 100 parts by weight of solvent to provide a copolymer and reacting said copolymer with 0.1 to 10 weight percent of at least one halogen based on the weight of said halogenated copolymer; and (b) an amino-aromatic polyamine compound selected from the group consisting of:
(a) N-aminopropyl-N'-phenylphenylenediamine;
(b) an N-arylphenylenediamine represented by the formula:

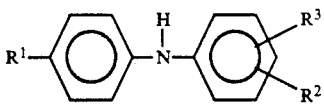

in which $R^1$ is hydrogen, —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, $CH_2—(CH_2)_n—NH_2$, $CH_2$—aryl—$NH_2$, in which n has a value from 1 to 10, and $R^3$ is H, alkyl, alkenyl, alkoxyl, aralkyl, alkaryl having from 4 to 24 carbon atoms;
(c) an aminocarbazole represented by the formula:

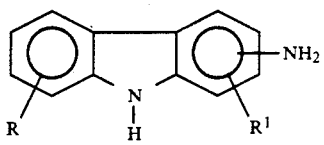

in which R and $R^1$ represent hydrogen or an alkyl, alkenyl, or alkoxyl radical having from 1 to 14 carbon atoms;
(d) an amino-indazolinone represented by the formula:

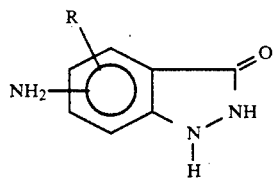

in which R hydrogen or an alkyl radical having from 1 to 14 carbon atoms;
(e) an aminomercaptotriazole represented by the formula:

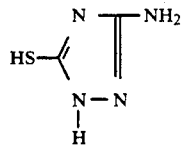

(f) an aminoperimidine represented by the formula:

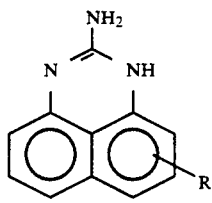

in which R represents hydrogen or an alkyl or alkoxyl radical having from 1 to 14 carbon atoms.

11. The viscosity index improver of claim 10 wherein said $C_3$ to $C_8$ alpha-olefin is propylene.
12. The viscosity index improver of claim 10 wherein said $C_3$ to $C_8$ alpha-olefin is styrene.
13. The viscosity index improver of claim 10 wherein said copolymer further includes at least one polyene.
14. The viscosity index improver of claim 13 wherein said polyene comprises straight chain acyclic dienes, branched chain acyclic dienes, single ring alicyclic dienes, multi-single ring alicyclic dienes, multi-ring alicyclic fused and bridged ring dienes, trienes having at least two non-conjugated double bonds and up to about 30 carbon atoms in the chain, and mixtures thereof.
15. The viscosity index improver of claim 10 wherein said at least one halogen comprises chlorine or bromine.
16. The viscosity index improver of claim 10 wherein said N-arylphenylenediamine is selected from the group consisting of N-phenyl-1,4-phenylenediamine, N-phenyl-1,3-phenylenediamine, N-phenyl-1,2-phenylenediamine, N-naphthyl-1,4-phenylenediamine and N-aminopropyl-N'-phenylphenylenediamine.
17. A lubricating oil composition comprising a major amount of an oil of lubricating viscosity and a minor amount effective to impart viscosity index improvement, dispersancy and antioxidant properties to said oil of an additive, said additive comprising: (a) a halogenated copolymer prepared by reacting, at a temperature of 0° C. to 100° C. and a pressure of 1 atmosphere to 160 psig in a solvent medium, 2 to 20 parts by weight of ethylene per 100 parts by weight of solvent and 4 to 20 parts by weight of a $C_3$ to $C_{18}$ alpha-olefin or mixtures thereof per 100 parts by weight of solvent to provide a copolymer, and reacting said copolymer with 0.1 to 10 weight percent of at least one halogen based on the weight of said halogenated copolymer; and (b) an amino-aromatic polyamine compound.
18. The lubricating oil composition of claim 17 wherein said halogenated copolymer is prepared from a $C_3$ to $C_8$ alpha-olefin.
19. The lubricating oil composition of claim 17 wherein said $C_3$ to $C_{18}$ a alpha-olefin is propylene.
20. The lubricating oil composition of claim 17 wherein said $C_3$ to $C_{18}$ a alpha-olefin is styrene.
21. The lubricating oil composition of claim 17 wherein said copolymer further includes at least one polyene.
22. The lubricating oil composition of claim 21 wherein said polyene comprises straight chain acyclic dienes, branched chain acyclic dienes, single ring alicyclic dienes, multi-single ring alicyclic dienes, multi-ring alicyclic fused and bridged ring dienes, trienes having at least two non-conjugated double bonds and up to about 30 carbon atoms in the chain, and mixtures thereof.
23. The lubricating oil composition of claim 17 wherein said at least one halogen comprises chlorine or bromine.
24. The lubricating oil composition of claim 17 wherein said amino-aromatic polyamine compound comprises:
(a) N-aminopropyl-N'-phenylphenylenediamine;
(b) an N-arylphenylenediamine represented by the formula:

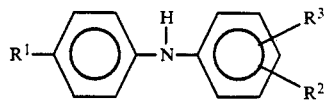

in which R¹ is hydrogen, —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, $CH_2-(CH_2)_n-NH_2$, $CH_2$—aryl—$NH_2$, in which n has a value from to 10, and $R^3$ is H, alkyl, alkenyl, alkoxyl, aralkyl, alkaryl having from 4 to 24 carbon atoms;

(c) an aminocarbazole represented by the formula:

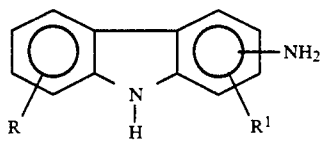

in which R and R¹ represent hydrogen or an alkyl, alkenyl, or alkoxyl radical having from 1 to 14 carbon atoms;

(d) an amino-indazolinone represented by the formula:

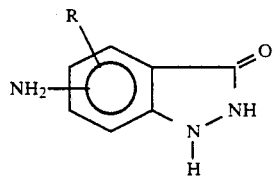

in which R is hydrogen or an alkyl radical having from 1 to 14 carbon atoms;

(e) an aminomercaptotriazole represented by the formula:

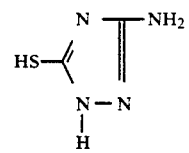

(f) an aminoperimidine represented by the formula:

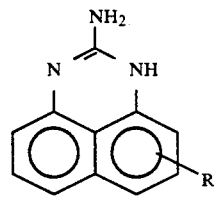

in which R represents hydrogen or an alkyl or alkoxyl radical having from 1 to 14 carbon atoms.

25. The lubricating oil composition of claim 24 wherein said N-arylphenylenediamine is selected from the group consisting of N-phenyl-1,4-phenylenediamine, N-phenyl-1,3-phenylenediamine, N-phenyl-1,2-phenylenediamine, N-naphthyl-1,4-phenylenediamine and N-aminopropyl-N'-phenylphenylene-diamine.

26. The lubricating oil composition of claim 17 wherein said additive is employed in an amount of about 1 to about 30 weight percent based on the total weight of said composition.

27. The lubricating oil composition of claim 17 wherein said additive is employed in an amount of about 8 to about 15 weight percent based on the total weight of said composition.

28. A concentrate for a lubricating oil comprising a diluent oil of lubricating oil viscosity and from about 1 to about 50 weight percent of the additive of claim 1 based on the total weight of said concentrate.

* * * * *